3,328,127
PROCESS FOR THE PRODUCTION OF REFRACTORY HARD METAL BORIDES

Alva C. Byrns, Lafayette, Calif., assignor to Kaiser Aluminum & Chemical Corporation, Oakland, Calif., a corporation of Delaware
No Drawing. Filed Jan. 31, 1962, Ser. No. 170,236
4 Claims. (Cl. 23—204)

This invention relates to the production of high purity refractory hard metal boride material. More particularly, the invention is directed to a commercially economical two-stage process for producing refractory hard metal borides in relatively large quantities.

As used herein in the specification and claims, the term "refractory hard metal" refers to the art recognized definition which includes high melting hard substances which are of metallic nature but are, however, technically inorganic compounds. "Refractory hard metal" materials include the refractory carbides, borides, nitrides and silicides of metals in the fourth to sixth groups of the periodic chart. Among the more important substances of this type are the carbides and borides of titanium, zirconium, niobium and tantalum and hafnium. The invention involves the production of relatively high purity refractory hard metal boride materials by a two-stage process.

Refractory hard metal boride powders have been produced by a variety of methods which in general involve combining the appropriate reactants and subjecting the reactants to the necessary reaction temperature. Generally speaking, refractory hard metal borides have been produced by carbothermal reactions of which the following are examples:

$$TiO_2 + B_2O_3 + 5C \rightarrow TiB_2 + 5CO$$

$$2ZrO_2 + B_4C + 3C \rightarrow 2ZrB_2 + 4CO$$

Reaction temperatures employed for conducting the above described single stage carbothermal reductions have generally involved temperatures on the order of 1900–2200° C. Despite rigorous controls of reaction conditions, purity of raw materials, etc., no totally satisfactory commercial scale production process has been achieved. That is to say, no commercial refractory hard metal boride production process has been designed wherein the boride product is of sufficient purity and the process capable of performance in sufficiently large quantities as to be economical.

The present invention involves a two-step reaction process of the appropriate reactants in admixture to yield the desired boride or mixture of borides. In the first stage, for example, the mixture of at least one metal oxide and a boron compound from the group consisting of boron oxide, boron carbide and boric acid, with carbon, and a binder if desired, is first reacted at a temperature in the range of 1100–1500° C., preferably in a reducing atmosphere. This temperature range is considerably lower than that previously considered possible or used in refractory hard metal boride production. The reaction in this stage will be completed to produce a crude boride product according to the following reaction:

Metal oxide + $B_2O_3$ + C → metal boride + CO

The crude boride-containing product from the reaction of the fisrt stage, according to the invention, is then ground, if necessary, mixed and analyzed. At least one substance from the group consisting of metal oxides, boron oxide, boron carbide, refractory hard metal carbides, and carbon, is added to adjust the stoichiometry to achieve a boride material end product of desired composition. The adjusted mixture is then preferably compacted to provide a green strength sufficient to render the bodies self-supporting and the self-supported mixture is subjected to a relatively higher temperature (1600–1850° C.) than used in the first reaction stage. This temperature in the second stage, while higher than the first-stage reaction temperature, is still considerably less than normally used in one-stage boride production processes.

The product of the two-stage reaction process will have a higher purity than can be realized in any practical commercial capacity single-stage reaction process. For maximum deoxidation in the second stage, a limited quantity of inert gas may be passed through the unit counter-current to the flow of material. Hydrogen gas is a particularly effective purge gas for this purpose, although argon, helium, and the like may be used.

Alternatively, the second stage may be performed under a vacuum in order to obtain maximum purity and minimum oxygen and nitrogen contamination. In many single-stage processes, vacuum conditions are impractical because of large quantities of gas evolved during reaction. In the two-stage process of the invention, the second stage reactions are accomplished with a minimum of gas evolution because of the relatively high purity starting material as compared to single stage operations.

As indicated above, the use of the lower temperature range for the first stage reaction, i.e. about 1100–1500° C., is essential and critical to the satisfactory performance of the invention. The utilization of these lower temperature ranges in the first-stage reaction has the advantage of providing a first stage product of very fine particle size. The extremely fine size boride product is obtained because the lower temperatures enable the arresting of grain growth and the particles are not free to increase in size as they would be at higher temperatures. The fine size of the crude boride material makes the blending for the second-stage starting material much easier and more accurate. Moreover, the fine particle size of the second-stage starting material may enable the production of a boride end product of finer size than would otherwise be attainable. Much of the boride powder production is ultimately intended for powder metallurgy applications wherein fine particle size is a great advantage.

An additional advantage provided by the invention wherein low reaction temperatures are employed in the first stage, is the considerable saving on boron oxide by preventing or minimizing boron oxide losses through volatilization. In processes where higher reaction temperatures are employed, boron oxide losses are significant and the effect of the loss of this relatively expensive starting material is reflected in the cost of operation and in the final cost of products produced with the boride material.

A third advantage of the two-stage process of the invention is the ability to conduct the first stage on a large volume basis in any of a variety of commercially available kilns or furnaces. Because of the relatively low temperature operation of the first-stage reduction, large quantities of starting material may be treated in conventional tunnel or shaft furnaces, etc. of any design without the burden of excessively stringent controls during operation. Thus, in addition to allowing large volume operations, the process does not require the use of expensive equipment of unusual design.

For some purposes the product of the first stage may, after physical beneficiation, have commercial use in itself. However, for many applications the product is not of sufficient purity for fabrication into articles by hot pressing, sintering, etc., particularly where it is necessary to have very low carbon, oxygen, etc. impurity content.

Production of large amounts of boride material, according to the invention, may be accomplished without the problems inherent in producing suitably pure powder material by simple, single-stage reduction. Moreover, as stated above, the two-stage system also enables the production of a boride product of exceptionally fine particle size so that the grinding of powders to a suitable size for fabrication may be minimized or avoided. This not only increases the economical efficiency of the production process, but minimizes the introduction of impurities from the grinding equipment and the introduction of oxygen impurity by exposure to the atmosphere.

According to one embodiment of the process, mixed boride materials may be produced while eliminating the difficult problem of mixing separate materials to proper homogeneity prior to fabrication. As an example, small amounts of chromium boride may be introduced into a titanium boride mass or a mixture of titanium boride and zirconium boride may be produced. In addition, it is possible to produce mixtures of titanium boride containing titanium carbide. Such mixtures may be obtained by controlling the proportion of oxides and carbon in the reaction mix introduced at the first stage.

As a further illustration of the invention, essentially stoichiometric amounts of reactants are mixed together in the following proportions:

79.90 mols of $TiO_2$
69.64+1 grams excess $B_2O_3$
60 mols of carbon black

The mixture is heated to a first-stage reaction temperature of 1300° C. The product of the first-stage reaction, according to the following reaction, is a crude $TiB_2$ material of very fine particle size.

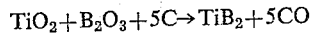

$$TiO_2 + B_2O_3 + 5C \rightarrow TiB_2 + 5CO$$

The titanium boride material has a purity of 93.5%. The impurities in the crude first-stage product are:

| Acid Insoluble Fraction | Acid Soluble Fraction |
|---|---|
| $B_4C$<br>$TiO_2$<br>Carbon<br>Other Titanium Oxides | TiC<br>TiN<br>TiO |

Raw material from the group consisting of metal oxides, refractory hard metal carbides, boron oxide, boron carbide, and carbon, are added in adjusted stoichiometric amounts to remove the impurities. The adjusted titanium boride-containing mixture is heated to a second-stage reaction temperature of 1700° C. The final titanium boride product is finely divided $TiB_2$ of 99% purity. The $TiB_2$ product has a total carbon content of 0.15% (as TiC) and no free carbon or boron carbide remaining. The amount of titanium carbide is 0.6% and the oxygen impurity content is less than 0.1%.

To further illustrate the relationship between reaction temperature and particle size distribution, particle size analysis reveals the following:

(1) Reactant material heated to 1300° C. results in a product having a maximum particle size of 10 microns with more than 50% of a size less than or equal to 5 microns.

(2) Reactant material heated to 1800° C. results in a product having 12% of the particles equal to or greater than 10 microns; 30% of 7 microns; and 30% of 5 microns.

(3) Reactant material heated to 2100° C. results in a particle size distribution wherein 35% of the particles are of a size equal to or greater than 10 microns; 20% are 5 microns; 25% are 7 microns; and 65% are less than 10 microns.

The two-stage process of the invention enables the production of high purity refractory hard metal boride material of a satisfactorily fine particle size and of a purity greater than 99%. Moreover, the invention enables the treatment of large quantities of raw material to produce a crude boride product without the need of extensive and careful controls and through the use of conventional large-scale equipment. By utilizing a starting material in the second stage of relatively high purity as compared to normal starting materials, the invention enables the production of high quality refractory hard metal boride material having low impurity contents particularly with respect to oxygen and carbon. It is noted, for example, that oxygen contents of less than 0.2% are readily obtainable by practicing the two-stage process of the invention.

It is apparent that various changes and modifications may be made without departing from the invention and the scope of the invention is to be limited only by the appended claims, wherein what is claimed is:

1. A method of producing refractory hard metal borides by a two-stage process comprising preparing a mixture of the oxide of at least one metal selected from the group consisting of titanium, zirconium, niobium, tantalum and hafnium of which the boride is to be made, carbon, and a boron compound from the group consisting of boron oxide, boron carbide, and boric acid, charging said mixture into a heating zone wherein said mixture is heated to a temperature within the range of 1100–1500° C. and obtaining crude refractory hard metal boride material as the first-stage product, mixing the crude boride product of the first stage with at least one substance from the group consisting of an oxide of at least one metal of which the boride is to be made, boron oxide, boron carbide, refractory hard metal carbides, and carbon, in sufficient amount to produce substantially pure refractory hard metal boride material as the final product of the second stage, heating said last mentioned mixture of crude boride to a temperature in the range of 1600–1850° C., and obtaining substantially pure refractory hard metal boride as aforesaid.

2. A method according to claim 1 wherein one of the first-stage reactants is titanium oxide and the product of the second stage is high purity titanium boride material of desired composition.

3. A method of producing refractory hard metal borides comprising a two-stage process, including stages (a) and (b), as follows:

stage (a) preparing a mixture of the oxide of at least one metal selected from the group consisting of titanium, zirconium, niobium, tantalum and hafnium of which the boride is to be made, carbon and a boron compound from the group consisting of boron oxide, boron carbide, and boric acid, heating said mixture of reactants to a temperature of 1100°–1500° C., recovering the crude refractory hard metal boride product;

stage (b) mixing the crude boride product of the first stage with at least one substance from the group consisting of an oxide of at least one metal of which the boride is to be made, boron oxide, boron carbide, refractory hard metal carbides, and carbon, in sufficient amount to produce, upon reaction with the crude boride product, substantially pure refractory hard metal boride, heating said last mentioned mixture to a temperature of 1600–1850° C., recovering substantially pure refractory hard metal boride material.

4. A method according to claim 3 wherein the first-stage reaction is performed in a reducing atmosphere.

References Cited

UNITED STATES PATENTS 2,913,312  11/1959  Dubeck _____ 23—204
3,013,862  12/1961  May _____ 23—204

FOREIGN PATENTS 771,633  4/1957  Great Britain.
785,995  11/1957  Great Britain.

OSCAR R. VERTIZ, *Primary Examiner.*

MAURICE A. BRINDISI, *Examiner.*

H. S. MILLER, M. N. MELLER, *Assistant Examiners.*